United States Patent
Schier

(10) Patent No.: US 6,246,988 B1
(45) Date of Patent: *Jun. 12, 2001

(54) METHOD AND APPARATUS FOR ACCESSING A DATA BASE VIA SPEAKER/VOICE VERIFICATION

(75) Inventor: John Schier, Austin, TX (US)

(73) Assignee: DSC Telecom L.P., Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,143

(22) Filed: Feb. 10, 1998

(51) Int. Cl.[7] .................................................. G10L 21/00
(52) U.S. Cl. ........................................... 704/273; 704/270
(58) Field of Search ..................................... 704/273, 270, 704/246

(56) References Cited

U.S. PATENT DOCUMENTS

| | | |
|---|---|---|
| 5,142,565 | 8/1992 | Ruddle . |
| 5,274,695 | 12/1993 | Green . |
| 5,390,278 | 2/1995 | Gupta et al. . |
| 5,450,524 | 9/1995 | Rissanen . |
| 5,455,861 | 10/1995 | Faucher et al. . |
| 5,465,290 | 11/1995 | Hampton et al. . |
| 5,499,288 | 3/1996 | Hunt et al. . |
| 5,513,250 | 4/1996 | McAllister . |
| 5,517,558 | 5/1996 | Schalk . |
| 5,566,229 | 10/1996 | Hou et al. . |
| 5,608,784 | 3/1997 | Miller . |
| 5,629,981 | * 5/1997 | Nerlikar ................................ 380/25 |
| 5,636,282 | 6/1997 | Holmquist et al. . |
| 5,666,466 | 9/1997 | Lin et al. . |
| 5,668,929 | 9/1997 | Foster, Jr. . |

FOREIGN PATENT DOCUMENTS

| | | |
|---|---|---|
| 2530843 | 1/1984 | (FR) . |
| 3309 566 | 9/1984 | (GB) . |
| 1-106660 | 4/1989 | (JP) . |
| 2-177754 | 7/1990 | (JP) . |
| 3-22696 | 1/1991 | (JP) . |

* cited by examiner

Primary Examiner—Fan Tsang
Assistant Examiner—Michael N. Opsasnick
(74) Attorney, Agent, or Firm—Jackson Walker, LLP

(57) ABSTRACT

A method and apparatus employing voice identification techniques to ensure only authorized users obtain remote access to a data base or computer system. Potential users dial an access number and speak to a security system using a standard telephone. The security system compares the real time voice input to a previously recorded voice print obtained from the authorized user. If the comparison scores high enough to meet a previously established criteria, the user is identified as the authorized user who submitted the previously recorded voice print and the security system then permits the user to access the data base or computer system. The present invention transmits both the users's analog and digital information along a single line to a publicly switched telephone network (PSTN), and therefore is capable of use in currently existing and common telephone lines.

15 Claims, 4 Drawing Sheets

METHOD AND APPARATUS FOR ACCESSING A DATA BASE VIA SPEAKER/VOICE VERIFICATION

FIELD OF THE INVENTION

The present invention relates to controlling access to computer systems and data bases. More particularly, the present invention relates to a method and apparatus for using voice print matching to identify users who are authorized to gain remote access to a data base or computer system.

BACKGROUND INFORMATION

The global nature of today's economy often requires employees to travel away from their home office to serve existing clients or to generate new business. The impracticality of transporting volumes of data or massive amounts of computer equipment from the home office to the traveling employee's destination has given rise to technology which permits the traveling employee to remotely access these resources while physically located away from the permanent location of these resources. An example of this remote access technology includes accessing data bases or computer systems with a laptop computer connected to a standard telephone line via a modem. While remote access is a convenient solution which permits traveling employees to have easy access to immobile resources, this convenience also opens the systems containing these resources to the possibility that non-authorized persons may obtain access to the sensitive and confidential information these resources may contain.

Remote access often by-passes the security measures implemented in the area immediately surrounding the main system. It is known in the art to use account numbers, passwords and/or personal identification numbers (PINs) to identify authorized users and control access to the computer systems. Unfortunately, the methods for controlling access to data bases or computer systems can be easily compromised. Account numbers, passwords and PINs can be discovered by non-authorized persons or this information can be willingly disclosed by authorized users to non-authorized persons. Once these security measures are compromised, non-authorized persons may obtain access to sensitive data bases or computer systems.

There are known methods for identifying a person based upon the unique characteristics of that person's voice. Existing computer models are capable of a near real time comparison between a spoken voice sample and a previously recorded voice print. Upon receiving a real time voice sample, a computer scores the comparison of the real time voice sample and the previously recorded voice print. If the score meets a previously established criteria, then the identity of the person who input the real time voice sample is determined to be the same as the identity of the person who submitted the recorded voice print. The unique nature of a person's voice generally cannot be sufficiently imitated by another person. Thus, it is unlikely a voice print match can be achieved by anyone other than the person who submitted the recorded voice print.

SUMMARY OF THE INVENTION

There is a need to develop security measures which ensure only authorized users obtain remote access to data bases and/or computer systems and which limit the chances that an unauthorized user will circumvent the security procedures. The present invention is an adaptation of known telephone access systems, e.g., the Sprint Voice FONCard system, modified using known voice verification techniques to make a highly robust overall security system. According to an embodiment of the present invention, a person is identified as an authorized user of a data base or computer system when the person's real time voice input matches a previously recorded voice print of the same person. This voice print verification may be augmented by the use of passwords, PINs, passphrases or digits to further enhance system security. Unlike U.S. Pat. No. 5,636,282, the present invention transmits both the users's analog and digital information along a single line to a publicly switched telephone network (PSTN), and therefore is capable of use in currently existing and common telephone lines. The present invention is also advantageous in that all callers must call into the security system to access the database, and the database may not be accessed directly from a remote location. The security system has the only connection to the remote access line or lines to the database, and the security system dials into, or otherwise connects, to the database remote access line, thus reducing the risk of circumvention of the security system.

DETAILED DESCRIPTION

Figure 1:
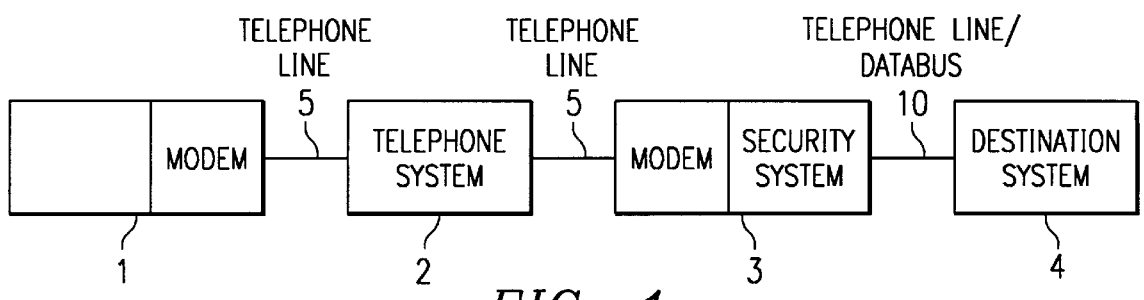
FIG. 1 illustrates a generic block diagram of an apparatus according to an embodiment of the present invention.

FIG. 1 is a generic block diagram of an apparatus constructed according to an embodiment of the present invention. A remote device 1 (such as a laptop computer, a personal computer or a dumb terminal) is coupled to a telephone system 2 (e.g., a standard Public Switched Telephone Network (PSTN)) or a digital telephone system (e.g., an Integrated Systems Digital Network (ISDN) telephone system) via a telephone line 5. The security system 3 is coupled to the telephone system 2 via telephone line 5 and security system 3 is coupled to the destination system 4 via any known coupling 10, such as a telephone line or databus. Known coupling 10 may include the capacity to permit simultaneous access by multiple users. The incoming coupling 10 to the destination system 4 is the only remote connection to the destination system 4, and the destination system 4 is not separately connected to the telephone system 2, other than the connection which is made through the security system.

Figure 2:
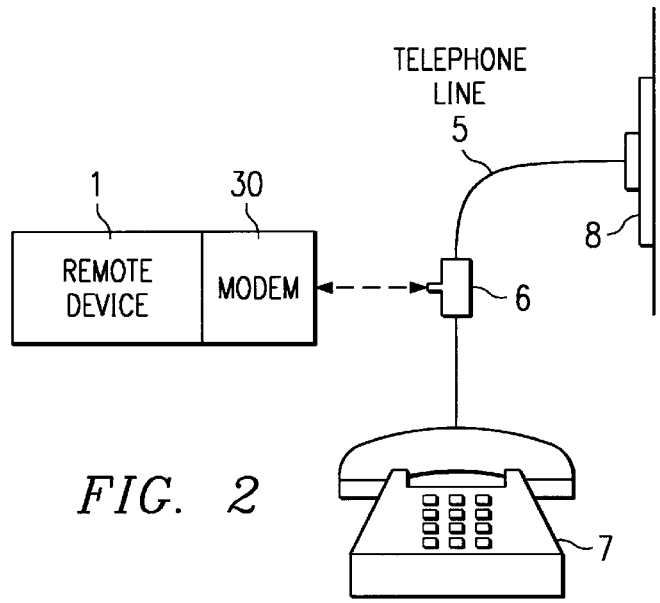
FIG. 2 illustrates the use of a three way telephone jack connector to connect a remote device to a telephone system according to an embodiment of the present invention.

FIG. 2 illustrates the use of a three way telephone jack connector 6 to facilitate connecting the remote device 1 to telephone system 2 according to an embodiment of the present invention. The remote device 1 includes an internal or external modem 5. One of the three outputs of three way telephone jack connector 6 is coupled to remote device 1 via the modem 3. A second output of three way telephone jack connector 6 is coupled to a telephone handset 7. The third output of three way telephone jack connector 6 is coupled to a telephone line 5. The telephone line is coupled in a known manner to telephone system 2 (see FIG. 1) via a telephone jack 8. Alternately, the three-way connector could be internal to the remote device 1 or the telephone handset 7, via "phone" and "line" jacks, or the telephone handset 7 could be integrated into the remote device 1.

According to the embodiments illustrated in FIGS. 1 and 2, a user dials into the security system via telephone handset 7 or via remote device 1 if the telephone handset 7 is integrated therein. The security system prompts the caller to input the caller's authorization number. The caller speaks his or her authorization number into the telephone handset 7 or into a microphone or other analog input device integrated into remote device 1. Security system 3 compares the caller's real time voice print of the authorization number to a previously recorded voice print of the caller speaking the authorization number. This comparison is accomplished using known a voice comparison system, such as the Sprint Voice FONCard System. If the voice print comparison meets a sufficient threshold, the security system then connects the coupling 10 with the incoming call (either by automatically dialing the telephone number for the connection 10 or by any other known connection or switching technique), thereby allowing access to the destination system 4 by the incoming call. The destination system 4 may be a data base, an E-mail system, a facsimile (FAX) mailbox, a computer system or any control system. Once the connection to the destination system 4 is made by the security system 3, the caller may then hang up the telephone handset 7, or the remote device 1 may disable that connection, and interact with the destination system 4 using the remote device 1.

In another embodiment of the present invention, the caller may enter an authorization number via a DTMF or pulse telephone or a computer capable of DTMF or pulse output, and also speak a password (which may or may not be the same as the authorization number). In that embodiment of the invention, the security system converts the DTMF or pulse signals to digital form representing the corresponding numbers for those signals, then compares those numbers to a stored pass number or PIN (either for the system as a whole, or for a particular user). If a match is found, the user is then prompted to speak a password or passphrase (alternatively, the password or passphrase step could be accomplished before the pass number or PIN). Using known voice recognition techniques, the spoken password or passphrase is compared to a stored password or passphrase in the authorized user's voice, and if sufficient thresholds are met in the comparison, the security system 3 connects the user to the destination system 4.

In each of the embodiments of the present invention, the security system 3 calls or otherwise connects to the connection 10 of the destination system. The user never knows the database or destination system 4 telephone number or how connection 10 is implemented. Alternatively, a connection may exist between the security system and the database, with no telephone number, so the user must go through the security system to access the database. Both of these database access options help to further prevent unauthorized bypass of the security system by unauthorized users, because the authorized users are never aware of the manner in which connection 10 is made, or the telephone number used to make connection 10. This prevents unauthorized users from acquiring this information from authorized users, and prevents previously-authorized users from using the connection information after revocation of their authorization.

Figure 3:
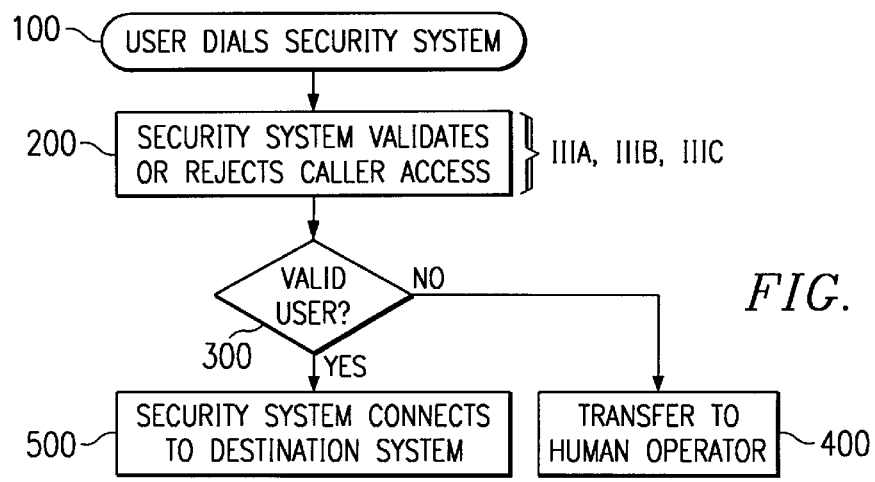
FIGS. 3, 3a, 3b and 3c are flow charts for a computer or other processing device or system used to implement an embodiment of the method according to the present invention.
Figure 3A:
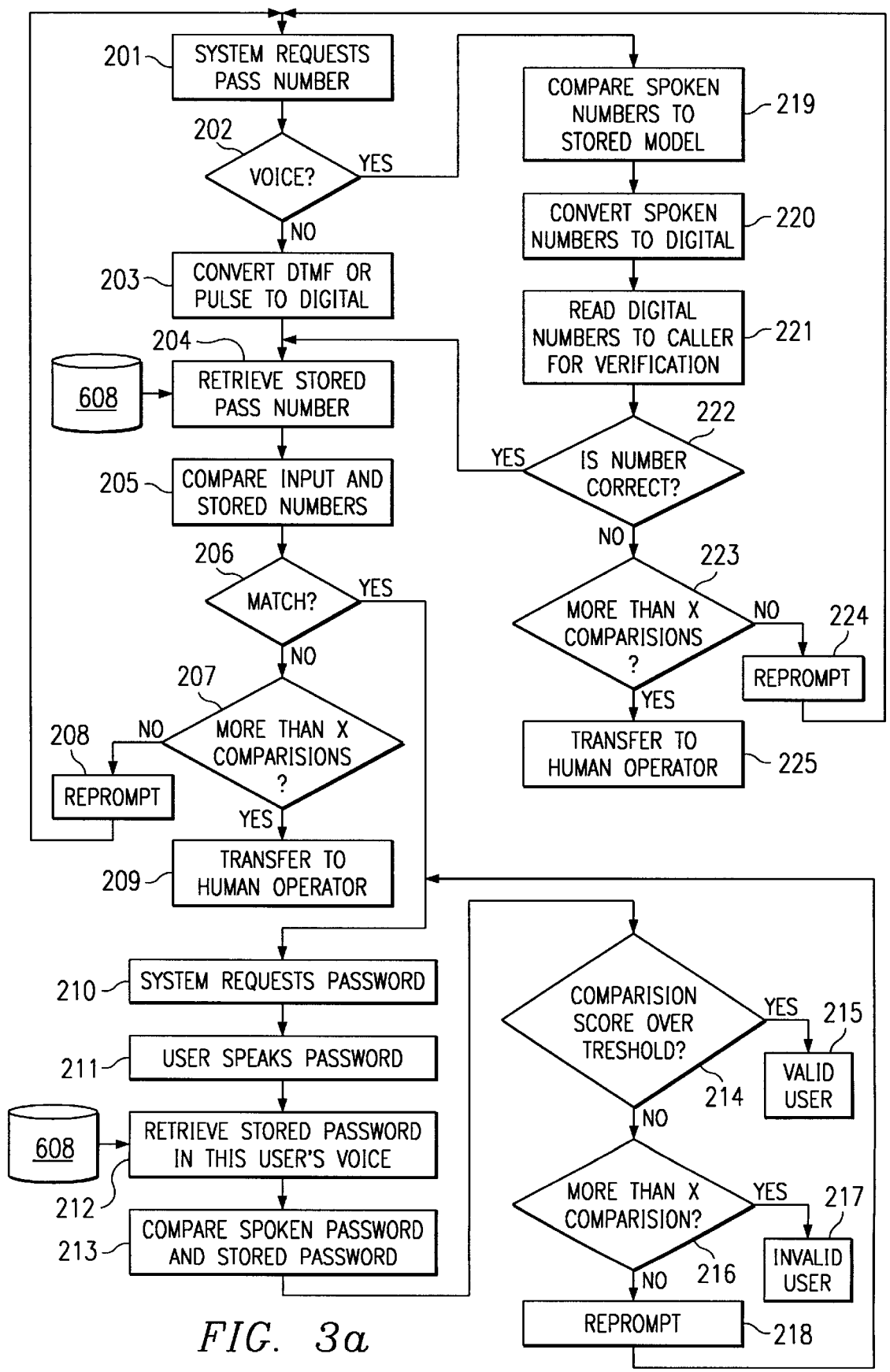
Figure 3B:
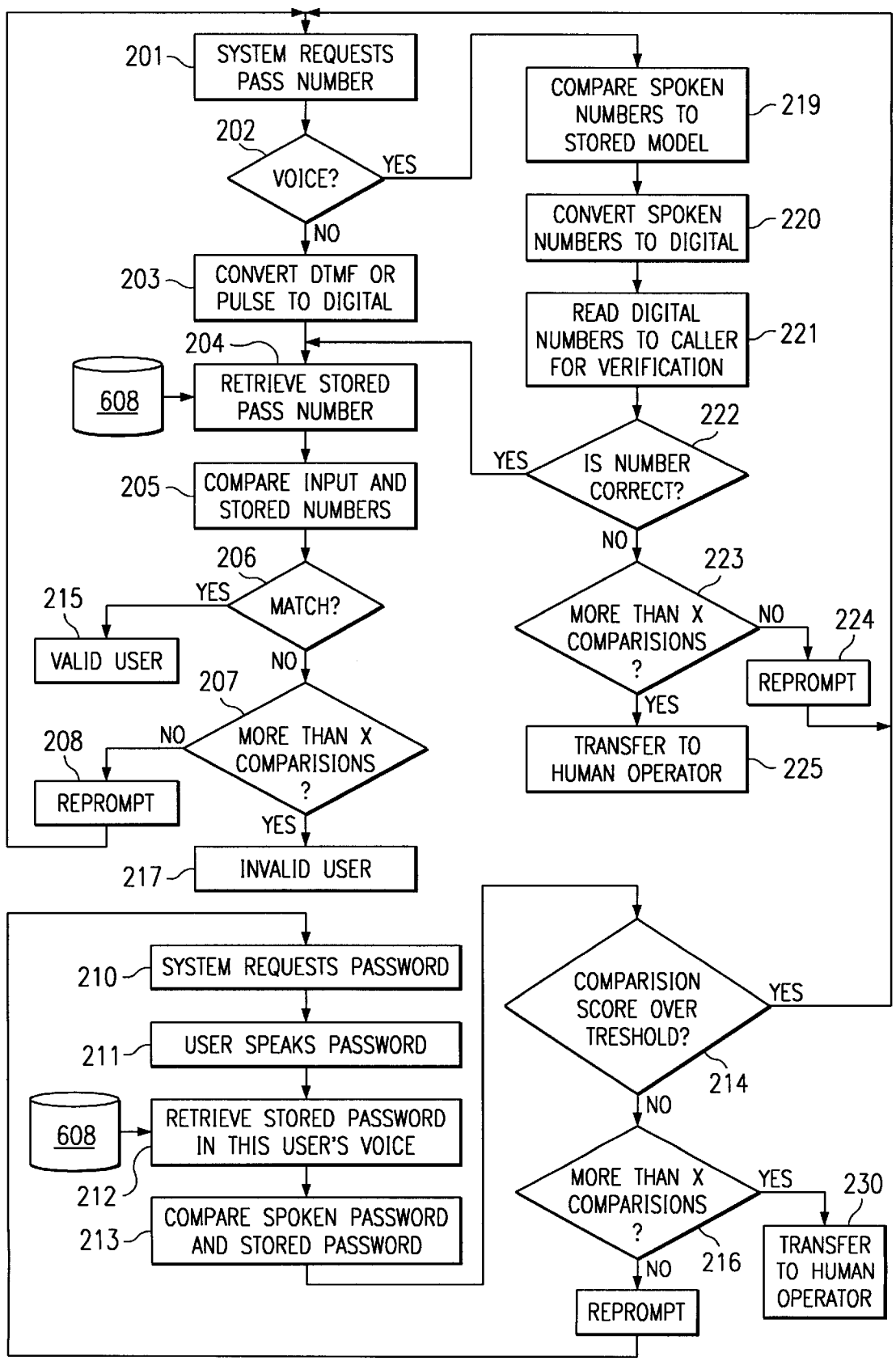
Figure 3C:
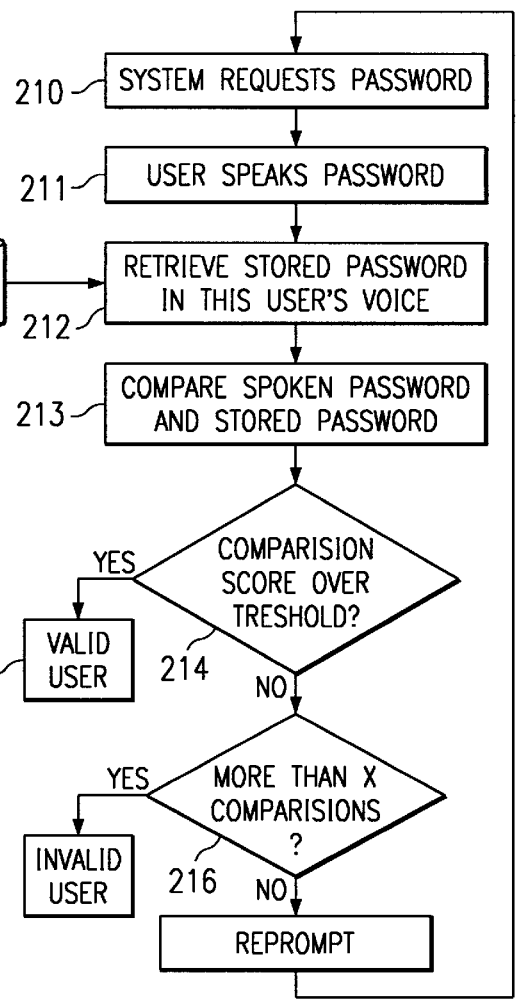

FIG. 3 shows an overall flowchart for the operation of software or other controlling code used in implementing the present invention. At step 100, the user, via telephone system 2, connects with security system 3. In step 200 (which step may be implemented in a number of different ways, as shown in FIGS. 3a, 3b and 3c, the security system 3 determines if the caller is a valid user of the destination system 4. In step 300, if the caller is verified as a valid user, the system, in step 500 connects the caller to the destination system 4 via line 10. If, in step 300, the caller is not verified as a valid user, the security system does not connect the caller to the destination system 4, and disconnects the caller from the security system 3. In another embodiment, if the caller is not verified, the caller is transferred to a human operator to achieve identification verification through other methods.

FIG. 3a shows a first embodiment of the validation step 200 in FIG. 3. In step 201, the security system prompts the caller by requesting a pass number. In step 202, the security system determines whether the responsive input from the caller is in the form of a voice response or not. This can be accomplished using known voice recognition systems, such as DSC IP 4000. If the responsive input is not voice, at step 203, the system converts the input DTMF or pulse signals from the caller into digital form, using known hardware and software/firmware for that purpose, such as that used in the DSC IP 4000. In step 204, the security system retrieves, from a storage device such as that utilized in the Sprint Voice FONCard System, pass numbers for authorized users of the destination system. In step 205, the security system compares the input pass number to the retrieved stored pass number or numbers. If a match is found, in step 210 the system prompts the user to speak a password or passphrase. If a match is not found, the system determines if more than X number of comparisons have been made in step 205 (X being a small number such as two or three). If more than X comparisons have been made, the security system 3 disconnects the call. If less than X comparisons have been made, the security system may reprompt the user at step 208 by rerequesting the pass number (repeating the above steps).

In step 211 the user speaks the password or passphrase. In step 212, the security system retrieved a previously-recorded and stored sample of the user speaking his or her password or passphrase (the user having already been identified according to the pass number previously entered and verified). In step 213, the security system compares the spoken password or passphrase with the retrieved password or passphrase, using known voiceprint comparison systems such as the Sprint Voice FONCard System. If, at step 214, it is determined that the comparison score is over an acceptable threshold, in step 215 the system confirms that the caller is a valid user, and proceeds to step 300. If, at step 214, the comparison score is not over the threshold, the system determines if more than X number of comparisons have been made in step 213 (X being a small number such as two or three). If more than X comparisons have been made, the security system 3 determines that the caller is an invalid user, and proceeds to step 300. If less than X comparisons have been made, the security system may reprompt the user at step 218 by rerequesting the password or passphrase (repeating the above steps).

If, at step 202, it is determined that the pass number is given in voice signals, in step 219, known voice recognition systems, such as the DSC IP 4000, are used to compare the spoken input to stored models for spoken digits. In step 220, the spoken input is converted into digital numerical information based on recognition algorithms in the voice recognition system. In step 221, the digital numerical information is read back to the caller, and the caller is given the opportunity at step 222 to verify that the digital numerical information is what was spoken by the user. If at step 222 the caller (using voice or DTMF/pulse input) confirms that the digital numerical information is what was spoken, then the system proceeds to step 204. If at step 222 the caller does not confirm that the spoken information corresponds to the digital numerical information, the system determines if more than X number of comparisons have been made in step 219 (X being a small number such as two or three). If more than X comparisons have been made, the security system 3 disconnects the call at step 225. If less than X comparisons have been made, the security system may reprompt the user at step 224 by rerequesting the pass number (repeating the above steps).

FIG. 3*b* shows an alternative embodiment of the software or code of the present invention, in which the password or passphrase is first requested and then, after verification, the pass number is requested. In all other respects, however, the embodiment of FIG. 3*b* is identical to the embodiment of FIG. 3*a*.

FIG. 3*c* shows a further embodiment of the software or code of the present invention, in which verification is based only upon a spoken password or passphrase (it being understood that the password or passphrase could be a voice recited pass number in all of the embodiments of the invention).

In each of FIGS. 3–3*c*, it is to be understood that there could be preliminary steps of identifying a particular user by, e.g., automatic number identification (ANI) from the incoming call, reserving specific incoming telephone numbers for particular users, and/or requesting DTMF, pulse, or voice input regarding the user's account number, all of which information could be used to call up password, passphrase, pass number and/or voice print information as shown in FIGS. 3–3*c*.

It is also to be understood that although the preferred embodiment automatically connects the user to the destination system, thereby increasing security, the present invention also contemplates a system wherein the caller, after verification, dials or otherwise inputs the telephone access number for the connection 10 to the destination system 4.

Figure 4:
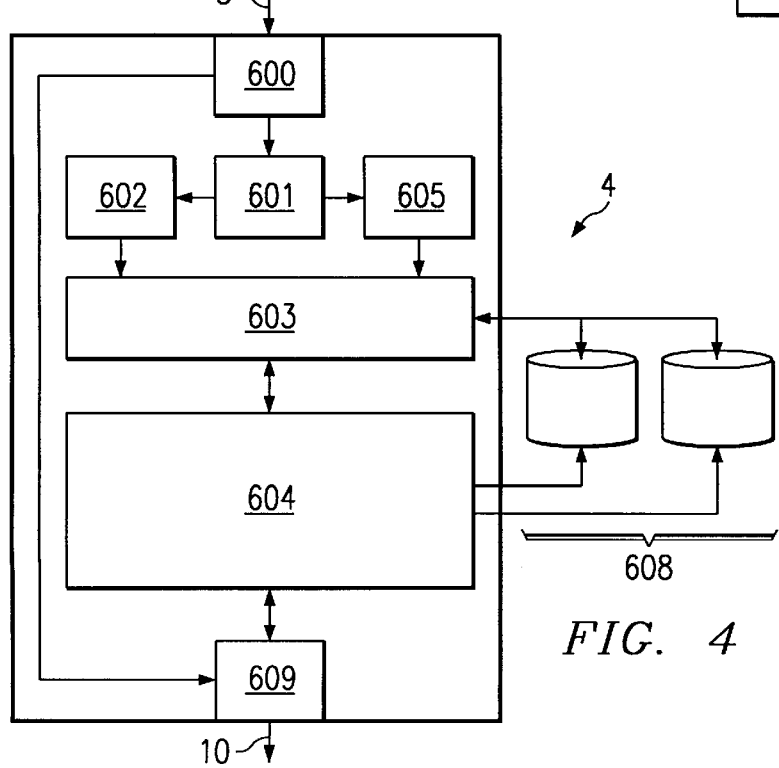
FIG. 4 is a schematic representation of the components of the security system of the present invention.

FIG. 4 is a schematic representation of the system architecture of the security system 4 of the present invention 3. The security system 4 includes a modem or other equivalent device 600 for receiving incoming analog telephone signals. A switch or router 601 distinguishes between voice and DTMF/pulse signals and routes DTMF/pulse signals to a DTMF/pulse converter 602, while routing voice signals to an analog-to-digital converter 602. Digitized signals from converter 602 and converter 605 can be sent to a memory unit of any known type 603 can be connected to a processor unit 604 of any known type, which retrieves information from memory unit 603 and processes that information. Processor unit 604 may be connected to one or more digital storage devices 608 (disk drives, tape drives, optical drives) which store digital information, and digital storage devices 608 may also be connected to memory unit 603, for writing information from the storage devices 608 into memory. Processor 604 controls a switch or dial-up unit 609, which serves to connect a incoming call on line 5 to connection 10 to destination system 4 (if the above security method verifies the caller as a valid user). It is to be understood that FIG. 4 shows an integrated system, and that the present invention could also be constructed of various modules, such as a voice verification module, a pass number verification module, a switching module, all of which are interconnected to implement the steps shown in FIGS. 3–3*c*.

While the invention has been described in the specification and illustrated in the drawings with reference to preferred embodiments, it will be understood by those skilled in the art that various changes may be made and equivalents may be substituted for elements of the invention without departing from the scope of the claims.

What is claimed is:

1. A method for granting an authorized user remote access to a destination system, comprising the steps of:

the security system receiving a real-time voice print from a potential user via a telephone line;

the security system comparing the real-time voice print to a recorded authorized user voice print of an authorized user;

the security system identifying the potential user as the authorized user if the comparison between the real-time voice print and the recorded authorized user voice print meets a previously determined criteria and the security system granting the potential user access to the destination system via a remote device coupled to the security system via the telephone line if the potential user is identified as the authorized user, including the security system coupling the remote device to the destination system by establishing a connection from the telephone line to a further connection that is a remote connection between the security system and the destination system.

2. The method according to claim 1, wherein the request for access and the real-time voice print are received via a telephone handset coupled to the telphone line.

3. The method of claim 1, wherein said establishing step includes the security system establishing the remote connection independently of the potential user and the remote device.

4. The method of claim 3, wherein said last-mentioned establishing step includes the security system calling a telephone number associated with the destination system to establish the remote connection.

5. The method of claim 1, including recording a voice print from the authorized user, recording particular information associated with the authorized user, receiving a request for access from the potential user via the telephone line, prompting the potential user for the real-time voice print, requesting particular information from the potential user, receiving particular information from the potential user, and comparing the received particular information from the potential user with the recorded particular information associated with the authorized user, said identifying step including the security system identifying the potential user as the authorized user if said comparison meets said criteria and the received particular information matches the recorded particular information, wherein the destination system includes one of a database and a first computer system, and wherein the remote device includes one of a second computer system and a dumb terminal.

6. The method of claim 5, wherein the particular information is a pass number.

7. The method of claim 5, wherein the particular information is a password or passphrase.

8. An apparatus for providing an authorized user with remote access to a destination system, comprising:

an input for connection to a telephone line and for receiving via the telephone line a real-time voice print from a potential user of the destination system;

a security system coupled to said input and responsive to the real-time voice print for comparing the real-time voice print to an authorized voice print and for identifying the potential user as an authorized user if a comparison between the real-time voice print and the authorized voice print satisfies a predetermined condition; and an output for remote connection to the destination system, said output coupled to said security system for permitting the potential user to access the destination system via said security system and a remote device coupled to the telephone line, said security system responsive to an identification of the potential user as an authorized user for coupling the remote device to the destination system by establishing a connection from the telephone line to a further connection that is a remote connection between said output and the destination system.

9. The apparatus of claim 8, wherein said security system is operable for establishing the remote connection independently of the potential user and the remote device.

10. The apparatus of claim 9, wherein said security system is operable for calling a telephone number associated with the destination system to establish the remote connection.

11. The apparatus of claim 8, wherein the destination system includes one of a database and a first computer system, and the remote device includes one of a second computer system and a dumb terminal.

12. A secure remote access system, comprising:

a destination system that is remotely accessible by authorized users;

a security system having an input and an output, said input for connection to a telephone line and for receiving via the telephone line a real-time voice print from a potential user of said destination system;

said security system responsive to the real-time voice print for comparing the real-time voice print to an authorized voice print and for identifying the potential user as an authorized user if a comparison between the real-time voice print and the authorized voice print satisfies a predetermined condition;

a remote connection between said security system output and said destination system for permitting communication therebetween;

said security system operable for permitting the potential user to access said destination system via said security system and a remote device coupled to the telephone line, said security system responsive to an identification of the potential user as an authorized user for coupling the remote device to said destination system by establishing a connection from the telephone line to said remote connection.

13. The system of claim 12, wherein said security system is operable for establishing the remote connection independently of the potential user and the remote device.

14. The system of claim 13, wherein said security system is operable for calling a telephone number associated with the destination system to establish the remote connection.

15. The system of claim 12, wherein said destination system includes one of a database and a first computer system, and the remote device includes one of a second computer system and a dumb terminal.

* * * * *